US012617690B2

(12) United States Patent
Kharas et al.

(10) Patent No.: US 12,617,690 B2
(45) Date of Patent: May 5, 2026

(54) CRYSTALLINE BOEHMITE MATERIALS AS PRECURSORS FOR LARGE CRYSTAL GAMMA ALUMINA AND LOW SURFACE AREA ALPHA ALUMINA

(71) Applicant: BASF CORPORATION, Florham Park, NJ (US)

(72) Inventors: Karl C. Kharas, Iselin, NJ (US); Danna Mooney, Natchez, MS (US)

(73) Assignee: BASF Corporation, Florham Park, NJ (US)

( * ) Notice: Subject to any disclaimer, the term of this patent is extended or adjusted under 35 U.S.C. 154(b) by 502 days.

(21) Appl. No.: 18/028,927

(22) PCT Filed: Sep. 16, 2021

(86) PCT No.: PCT/US2021/050749
§ 371 (c)(1),
(2) Date: Mar. 28, 2023

(87) PCT Pub. No.: WO2022/072149
PCT Pub. Date: Apr. 7, 2022

(65) Prior Publication Data
US 2023/0365424 A1     Nov. 16, 2023

Related U.S. Application Data

(60) Provisional application No. 63/084,835, filed on Sep. 29, 2020.

(51) Int. Cl.
| | |
|---|---|
| *C01F 7/448* | (2022.01) |
| *B01J 21/04* | (2006.01) |
| *B01J 29/08* | (2006.01) |
| *B01J 35/00* | (2024.01) |
| *B01J 35/02* | (2006.01) |

(52) U.S. Cl.
CPC .............. *C01F 7/448* (2013.01); *B01J 21/04* (2013.01); *B01J 29/084* (2013.01); *B01J 35/19* (2024.01); *B01J 2235/15* (2024.01); *C01P 2002/60* (2013.01)

(58) Field of Classification Search
CPC .. C01F 7/448; B01J 35/19; B01J 21/04; B01J 29/084
See application file for complete search history.

(56) References Cited

U.S. PATENT DOCUMENTS

| | | | |
|---|---|---|---|
| 2,916,365 | A | 12/1959 | Smith |
| 4,166,100 | A | 8/1979 | Vorobiev |
| 8,349,442 | B2 † | 1/2013 | Nakao |
| 10,633,596 | B2 | 4/2020 | McGuire |
| 2014/0224156 | A1 | 8/2014 | Baxter et al. |
| 2016/0340496 | A1 | 11/2016 | Loscutova |

FOREIGN PATENT DOCUMENTS

WO        2020020960  A1     1/2020

OTHER PUBLICATIONS

Egorova et al., Surfaces and Interfaces, (2018), v.13, 58-64.*
International Preliminary Report on Patentability for PCT/US2021/050749 mailed Mar. 28, 2023, 6 pages.
International Search Report and Written Opinion for PCT/US2021/050749 mailed Feb. 28, 2022, 9 pages.
Peintinger, MF et al. "Quantum-chemical study of stable, meta-stable and high-pressure 1-3 alumina polymorphs and aluminum hydroxides". Journal of Materials Chemistry A.. Jun. 24, 2014; abstract: p. 13145, col. 1, second paragraph.
Pinakov et al. "TSEFLAR—the centrifugal flash reactor for rapid thermal treatment of powdered materials", Chem. Eng. J. vol. 107, 157-161 (2005).
Martin Rudolph, et al., Thermally Induced Formation of Transition Aluminas from Boehmite, Advanced Engineering Materials, 2017, 19, No. 9, pp. 1, 9, May 2, 2017.†
Yingjian Jiang, et al., A computational study of energy barriers of structural transformations and hydrogen transfer in boehmite, RSC Adv., 2018, 8, pp. 2377-2378, 2383, Jan. 9, 2018.†
József Karger-Kocsis, et al., Polymer/boehmite nanocomposites: A review, J. Appl. Polym. Scl., 2018, 8, pp. 1-2 &Online Library p. 1, Aug. 11, 2017.†
P.K. Panda, et al., Hydrothermal synthesis of boehmite and -alumina from Bayer's alumina trihydrate, J. Mater Sci, 2006, 41, pp. 8386, 8389, Nov. 14, 2006.†

* cited by examiner
† cited by third party

*Primary Examiner* — Yong L Chu
(74) *Attorney, Agent, or Firm* — Peter DiMauro

(57)        ABSTRACT

A process for preparing crystalline boehmite includes combining a stoichiometric amount of flash calcined gibbsite ($Al_2O_3$) and gibbsite ($Al(OH)_3$) in a pressurizable reaction vessel; heating the flash calcined gibbsite and gibbsite in the reaction vessel to a temperature of about 200° C. to about 280° C. and for a time sufficient to form crystalline boehmite. A crystalline boehmite exhibiting a crystallite from about 600 Å to about 850 Å when measured in the 120 direction of the crystallographic space group Cmcm.

13 Claims, 6 Drawing Sheets

CRYSTALLINE BOEHMITE MATERIALS AS PRECURSORS FOR LARGE CRYSTAL GAMMA ALUMINA AND LOW SURFACE AREA ALPHA ALUMINA

CROSS REFERENCE TO RELATED APPLICATION(S)

The present application is a national stage entry under 35 U.S.C. § 371 of International Application No. PCT/US2021/050749, filed on Sep. 16, 2021, which claims priority to U.S. Provisional Patent Application No. 63/084,835, filed on Sep. 29, 2020, the entire contents of which are incorporated herein by reference in their entirety.

FIELD

The present technology relates to a process of preparing crystalline boehmite (AlOOH) and transitional aluminas from flash calcined gibbsite. In particular, the present technology relates to a process for preparing crystalline boehmite from reacting flash calcined gibbsite and gibbsite at stoichiometric ratios.

SUMMARY

In one aspect, provided is a crystalline boehmite exhibiting a crystallite from about 600 Å to about 850 Å when measured in the 120 direction of the crystallographic space group Cmcm. According to various embodiments, the crystallite size is from about 650 Å to about 850 Å, or from about 660 Å to about 760 Å.

In another aspect, a process is provided for preparing crystalline boehmite, the process includes combining a stoichiometric amount of flash calcined gibbsite ($Al_2O_3$) and gibbsite ($Al(OH)_3$) in a pressurizable reaction vessel, and heating the flash calcined gibbsite and gibbsite in the reaction vessel to a temperature of about 200° C. to about 280° C. and for a time sufficient to form crystalline boehmite. In any such embodiments, the heating may occur for a time sufficient to form at least about 5 mol % of crystalline boehmite based on the total amount of solids. In any such embodiments, the time sufficient to form crystalline boehmite may be at least about 30 minutes. In any such embodiments, the time sufficient to form crystalline boehmite may be about 30 minutes to about 1 week. In any such embodiments, the pressurized vessel is configured to prevent or minimize the release of steam from the vessel. In any such embodiments, the crystalline boehmite prepared may exhibit a crystallite size of about 600 Å to about 850 Å. In any such embodiments, the process may also include doping the crystalline boehmite with a rare earth element, bismuth, an alkaline earth metal, or a mixture of any two or more thereof.

In another aspect, a process is provided for preparing a transitional alumina, the process including preparing crystalline boehmite via a stoichiometric process that includes combining stoichiometric amounts of flash calcined gibbsite ($Al_2O_3$) and gibbsite ($Al(OH)_3$) in a pressurized reaction vessel; heating the flash calcined gibbsite and gibbsite in the reaction vessel to a temperature of about 200° C. to about 280° C. and for a time sufficient to form crystalline boehmite; and calcining the crystalline boehmite to form the transitional alumina. In any such embodiments, the calcining may be conducted at a temperature of about 400° F. to about 1200° F., or a temperature of about 450° F. to about 750° F., or a temperature of about 700° F. to about 1100° F. In any such embodiments, the transitional alumina may include γ-alumina. In any such embodiments, the process may also include doping the transitional alumina with a rare earth element, bismuth, an alkaline earth metal, or a mixture of any two or more thereof.

In another aspect, a composition is provided that includes any of the herein described crystalline boehmites or transitional aluminas, wherein the composition is selected from fluid catalyst cracking (FCC) catalysts, catalysts for preparing ethylene oxide, and emissions control catalysts.

In another aspect, an FCC catalyst includes Y-zeolite and any of the above crystalline boehmites exhibiting a crystallite size of about 600 Å to about 850 Å. Such composition may further include a transitional alumina. In any such embodiments, the FCC catalyst may include from about 5 wt. % to about 60 wt. % of the Y-zeolite based on total weight of the FCC catalyst.

In another aspect, a composition is provided that includes any of the above crystalline boehmites, or prepared crystalline boehmites, a transitional alumina as described or prepared herein, the composition is selected from fluid catalyst cracking (FCC) catalysts, catalysts for preparing ethylene oxide, and emissions control catalysts.

In another aspect, a FCC catalyst is provided that includes a Y-zeolite and a crystalline boehmite having a crystallite size of about 200 Å to about 850 Å. In any such embodiments, the catalyst may include microspherical support that includes the crystalline boehmite. In any such embodiments, the FCC catalyst may further include a transitional alumina prepared according to any of the processes described herein. In any such embodiments, the FCC catalyst includes from about 5 wt. % to about 60 wt. % of the Y-zeolite based on total weight of the FCC catalyst. In any such embodiments, the FCC catalyst may further include one or more of a rare earth element, bismuth, or an alkaline earth metal. In any such embodiments, the FCC catalyst may include an in situ Y-zeolite that may be obtained by mixing a precursor microspherical support comprising the crystalline boehmite with sodium silicate, a zeolite initiator, and water to form an alkaline slurry; and heating the alkaline slurry at a temperature, and for a time, sufficient to form the Y-zeolite. In any such embodiments, the precursor microspherical support may be obtained by spray drying a slurry comprising the crystalline boehmite to obtain the precursor microspheres; and calcining the precursor microspheres at a temperature of about 900° F. to about 1800° F.

In another aspect, a composition is provided that includes a first FCC catalyst, wherein the first FCC catalyst that includes a Y-zeolite and a crystalline boehmite having a crystallite size of about 200 Å to about 850 Å, and one or more of additional FCC catalysts, wherein the one or more additional FCC catalysts are different than the first FCC catalyst.

In another aspect, a method of cracking a hydrocarbon feed includes contacting the hydrocarbon feed with any of the FCC catalysts described herein.

DETAILED DESCRIPTION

Figure 1:
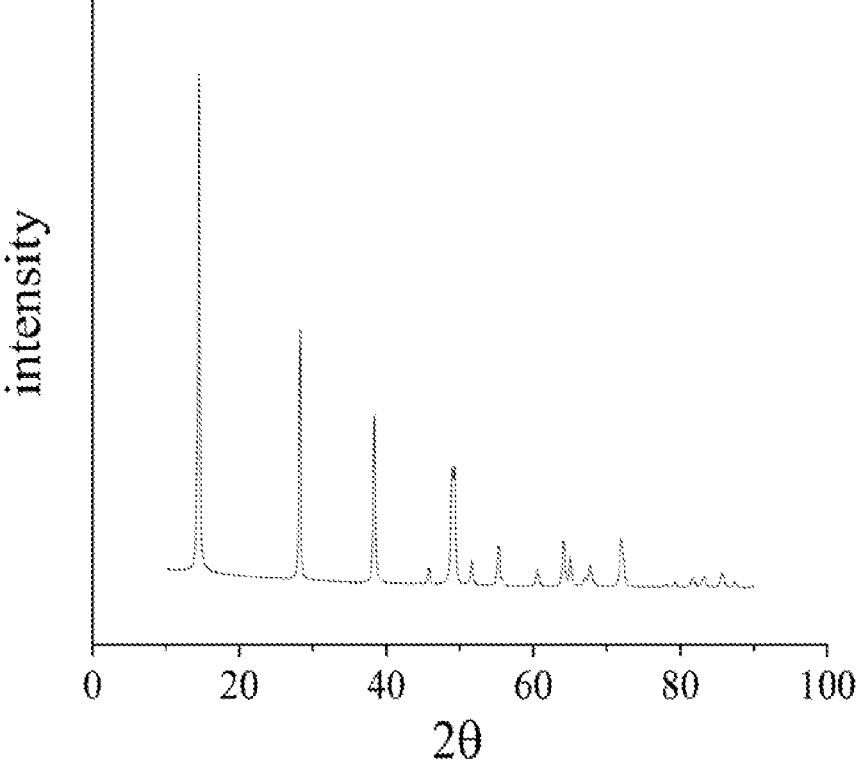
FIG. 1 is an X-ray Diffraction (XRD) pattern of boehmite (AlOOH) formed from gibbsite according to Example 1, Sample A.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

As used herein, the term "catalyst" refers to a material that promotes a reaction.

As used herein, the term "fluid catalytic cracking" or "FCC" refers to a conversion process in petroleum refineries wherein high-boiling, high-molecular weight hydrocarbon fractions of petroleum crude oils are converted to more valuable gasoline, olefinic gases, and other products.

"Cracking" refers to typical FCC process conditions. Typical FCC processes are conducted at reaction temperatures of 450° C. to 650° C. with catalyst regeneration temperatures of 600° C. to 850° C. Catalytic cracking is a petroleum refining process that is applied commercially on a very large scale. Catalytic cracking, and particularly fluid catalytic cracking (FCC), is routinely used to convert heavy hydrocarbon feeds to lighter products, such as gasoline and distillate range fractions. The cracked products are fractioned into a series of products, including gas, gasoline, light gas oil, and heavy cycle gas oil. Some heavier hydrocarbons may be recycled to the reactor.

As used herein, the term "feed" refers to that portion of crude oil that has a high coiling point and a high molecular weight. In FCC processes, a hydrocarbon feed is injected into the riser section of a FCC unit, where the feed is cracked into lighter, more valuable products upon contacting hot catalyst circulated to the riser-reactor from a catalyst regenerator.

As used herein, the term "zeolite" refers to a crystalline aluminosilicate with a framework based on an extensive three-dimensional network of oxygen ion s and have a substantially uniform pore distribution.

As used herein, the term "microsphere" refers to catalyst particles which can be obtained by preforming via spray drying and optionally calcining the kaolin clay and other materials (such as transitional alumina). As is understood by skilled artisans, microspheres are not necessarily perfectly spherical in shape. In addition, microspheres as disclosed herein may be utilized in fluidized catalytic processes.

Gibbsite may be calcined to boehmite at temperatures of about 100-300° C. Conversion of gibbsite to $\chi$-$Al_2O_3$ is an undesired side reaction. While boehmite is an important catalyst precursor, successful catalytic applications of $\chi$-$Al_2O_3$ are very rare. Practical attempts to implement this chemistry involve calcination of gibbsite in kilns that are leaky, especially for industrial scale kilns. Steam escapes and some gibbsite does not evolve to the desired AlOOH, but it instead converts to $\chi$-$Al_2O_3$. Some of the gibbsite goes through boehmite and, as the kiln is heated further, the boehmite desirably converts to $\gamma$-$Al_2O_3$. However, use of sealed vessels where steam cannot leak away is not preferred in practical implementations because the reaction system does not remain a two-phase gas/solid system but becomes a three-phase gas/solid/liquid system. Such three-phase reaction systems require expensive pressure vessels. Nonetheless, maintenance of a two-phase system inevitably entails loss of steam and undesirable formation of $\chi$-$Al_2O_3$.

Attempts to convert gibbsite to AlOOH in covered (but not rigorously sealed) cordierite crucibles fail, when converting gibbsite to boehmite (and $\chi$-$Al_2O_3$) at temperatures above about 200° C. Crystalline boehmites may be made commercially from gibbsite by hydrothermal treatment at temperatures above about 180° C. In general, these hydrothermal conversions are not desired because they require expensive autoclaves. As more highly crystalline boehmites are needed, temperatures needed to convert gibbsite to highly crystalline boehmite quickly become high. As hydrothermal synthesis temperatures increase, so, of course, does pressure of the water/steam mixture. Consequently, such hydrothermal conversions require expensive reactors.

The present inventors have now discovered a method of making crystalline, and preferably highly crystalline, boehmite in vessels requiring only low pressure. Flash calcined gibbsite is made commercially by conveying gibbsite through a heated tube at temperatures above about 500 or 600° C. with short residence times. During flash calcination of gibbsite, water is essentially quantitatively volatilized and a very poorly crystalline material, resembling $\chi$-$Al_2O_3$, is made. Sometimes this material has been called $\mu$-$Al_2O_3$. Flash calcined gibbsite is water reactive.

According to the present disclosure, gibbsite suitable for use in preparing boehmite include material that, on a volatile free (VF) basis, is greater than 99% alumina abut may contain small amounts of silica, soda (expressed as $Na_2O$), CaO, and/or $CaCO_3$. Typically, the gibbsite it is produced from a Bayer process, and it may or may not be dried and it may have a small amount (up to about 5 wt %) of associated water. Flash calcined gibbsite (FCG) is produced during rapid calcination of the gibbsite (i.e. "flash calcination"). Other methods of making flash calcined gibbsite include those disclosed in U.S. Pat. Nos. 2,916,365 and 4,166,100; and in Pinakov et al. *Chem. Eng. J.* vol 107, 157-161 (2005). FCG may also include a few percent (i.e. less than 15 wt %) water that is adsorbed into or onto the material. In some embodiments, this is less than 10 wt % water, or less than 5 wt % water. This water will provide steam in excess of the stoichiometric reactions described herein.

Without being bound by theory, it is believed that flash calcined gibbsite when exposed to stoichiometric amounts of gibbsite hydrates, flash calcines gibbsite to boehmite according to the following reaction scheme:

$$Al_2O_3 \text{ (flash calcined gibbsite)} + Al(OH)_3 \text{ (gibbsite)} \rightarrow 3 \text{ AlOOH (boehmite)}$$

As disclosed herein, the present inventors discovered the conversion of flash calcined gibbsite and gibbsite to crystalline boehmite follows a conproportionation reaction pathway. After full conversion to crystalline boehmite, no gibbsite is left, and there are no detectable amounts of flash calcined gibbsite. Without being bound by theory, it also appears gibbsite generates steam (water) which reacts with the flash calcined gibbsite. Because steam (water) reacts with the flash calcined gibbsite faster than gibbsite decomposes, it is believed that the increase in pressure due to steam evolution in the reactor is low. The present inventors found the AlOOH (boehmite) formed is highly crystalline.

As comparison, consider a closed reactor half filled with gibbsite, heated to 240° C. to make AlOOH. The reactor should be closed in order to prevent competitive undesired decomposition of some of the gibbsite to $\chi$-$Al_2O_3$. An ideal gas law treatment of the system indicates steam pressure would be above 1000 atm (atmospheres) but steam condenses to liquid was when pressure exceeds 31 atm at 240° C. Thus, a half-filled, closed reactor intended to make boehmite under the conditions considered above would necessarily become a hydrothermal reactor and require high capital cost.

The reaction system of the present invention beneficially creates a bimodal range of boehmite crystallites. Especially if the boehmites are platy in nature, they will be dispersible in basic aqueous solution. The composite, containing boehmite crystallites with two different size distributions, is likely to create a mismatch of particles that will create a certain level of macroporosity useful for ingress and egress of gas-phase reactant and product molecules.

Highly crystalline boehmite is useful in certain FCC catalysts and is thought to be useful for catalysts to make ethylene oxide, and in a wide variety of applications. For example, crystalline boehmites, or calcined aluminas prepared therefrom, may be used as traps for nickel in FCC catalyst applications, steam reforming catalyst supports, hydrocracking catalyst supports, hydrotreating catalyst supports, reforming catalysts supports, paraffin dehydrogenation catalyst supports, isobutane dehydrogenation supports, propane dehydrogenation supports, Fischer-Tropsch catalyst supports, chromatography supports, and the like.

The large crystal boehmites, when calcined to $\alpha$-$Al_2O_3$, can result in low surface area, less than 10 m²/g and perhaps less than about 1 m²/g. These materials are desired as supports for catalysts used to oxidize ethylene with air to make ethylene oxide.

In one aspect, the present technology provides a process for preparing crystalline boehmite. The process includes: combining stoichiometric amounts flash calcined gibbsite ($Al_2O_3$) and gibbsite ($Al(OH)_3$) in a pressurizable reaction vessel; and heating the flash calcined gibbsite and gibbsite in the reaction vessel to a temperature of about 200° C. to about 280° C. and for a time sufficient to form crystalline boehmite. For example, the pressurized reaction vessel should be configured to prevent, or at least minimize, any egress of steam from the reaction and the gibbsite. Once the materials are charged to the vessel, a valve, seal, or other means should be put in place to seal the reaction chamber/vessel.

In any embodiment disclosed herein, the heating may occur at a temperature of about 200° C. (392° F.) to about 260° C. (500° F.), about 200° C. (392° F.) to about 240° C. (464° F.), about 200° C. (392° F.) to about 230° C. (446° F.), about 200° C. (392° F.) to about 225° C. (437° F.), or any range including and/or in between any two of these values.

In any embodiment disclosed herein, the heating may occur for a time sufficient to form at least about 5 mol % of crystalline boehmite based on the total amount of solids. For example, in any embodiment disclosed herein, the heating occurs for a time sufficient to form about 5 mol %, about 10 mol %, about 15 mol %, about 20 mol %, about 25 mol %, about 30 mol %, about 35 mol %, about 40 mol %, about 45 mol %, about 50 mol %, about 55 mol %, about 60 mol %, about 65 mol %, about 70 mol %, about 75 mol %, about 80 mol %, about 85 mol %, about 90 mol %, about 95 mol %, about 99 mol %, 100 mol % of crystalline boehmite (based on total amount of solids) or any range including and/or in between any two of these values. In any embodiment disclosed herein, the heating may occur for a time sufficient to form about 5 mol % to 100 mol %, about 10 mol % to 100 mol %, about 20 mol % to 100 mol %, about 40 mol % to 100 mol %, about 60 mol % to 100 mol %, about 80 mol % to 100 mol %, about 90 mol % to 100 mol %, or any range including and/or in between any two of these values.

In any embodiment disclosed herein, the time sufficient to form crystalline boehmites is at least about 30 minutes. For example, illustrative times may be at least about 45 minutes, at least about 1 hour, or at least about 2 hours. In other embodiments, the illustrative time sufficient to form crystalline boehmites may be from about 30 minutes to about 1 week, about 2 hours to about 1 week, about 12 hours to about 5 days, about 24 hours to about 4 days, about 2 days to about 1 week, or any range including and/or in between any two of these values. Suitable heating times may include, but are not limited to, about 2 hours, about 2.5 hours, about 3 hours, about 3.5 hours, about 4 hours, or any such value within the parameters set forth above for time.

In any embodiment disclosed herein, the crystalline boehmite formed according to the process described herein may have a crystalline size of about crystallite size of about 600 Å to about 850 Å. Such crystallite sizes are determined along the crystallographic 120 direction in space group Cmcm (for boehmite). Illustrative sizes that are obtained by the process described above may be from about 600 Å to about 800 Å, about 650 Å to about 800 Å, about 660 Å to about 800 Å, or about 660 Å to about 750 Å. In any embodiment disclosed herein, the crystallite size may be determined by using the Scherrer equation to analyze the 120 reflection in the Cmcm space group, or the 021 reflection in the Amam space group. In certain embodiments, the crystallite size may be determined by using the Scherrer equation to estimate crystallite size using the reflection, obtained using Cu K$\alpha$ radiation, at about 28° 2$\theta$. The Scherrer equation uses the half-width of a reflection, along with the angle of the reflection and the wavelength of X-radiation, to estimate crystallite size.

In any embodiment disclosed herein, the flash calcined gibbsite and gibbsite reactants undergo a conproportionation reaction. As used herein, the term "conproportionation reaction" in which two reactants which have the same element come together to form one product. In any embodiment disclosed herein, the flash calcined gibbsite and gibbsite undergo a conproportionation reaction represented by the following equation:

$$Al(OH)_3 + Al_2O_3 \rightarrow 3\ AlOOH.$$

In any embodiment disclosed herein, the process may further include doping the crystalline boehmite with a rare earth element, bismuth, an alkaline earth metal, or a mixture of any two or more thereof. In any embodiment disclosed herein, the crystalline boehmite may be doped with a rare earth element (or oxide thereof). Suitable rare earth elements or oxides thereof may include, but are not limited to yttrium, scandium, praseodymium, neodymium, promethium, samarium, europium, terbium, dysprosium, holmium, erbium, thulium, lutetium, ytterbium, gadolinium, cerium, lanthanum, or mixtures thereof. In any embodiment disclosed herein, the crystalline boehmite may be doped with bismuth. In any embodiment disclosed herein, the crystalline boehmite may be doped with an alkaline earth metal. Suitable alkaline earth metals may include, but are not limited to, Suitable alkaline earth elements may be selected from magnesium, calcium, strontium, barium, or mixtures thereof.

In any embodiment disclosed herein, the pressurizable reaction vessel may be a Parr reactor, sealed pressure vessel, or other similar reaction vessel. In any embodiment disclosed herein, the reaction proceeds at low pressure. The pressure may approximately 20 atm or less. In some embodiments, this includes, approximately 15 atm or less, approximately 10 atm or less, approximately 8 atm or less, approximately 6 atm or less, approximately 4 atm or less, or approximately 2 atm or less.

In a related aspect, the present technology provides a crystalline boehmite formed according to the process described herein in any embodiment.

In another related aspect, the present technology provides a process for preparing a transitional alumina. The process includes: (i) preparing crystalline boehmite via a stoichiometric process, wherein the stoichiometric process of step (i) includes: combining stoichiometric amounts of flash calcined gibbsite ($Al_2O_3$) and gibbsite ($Al(OH)_3$) in a pressurized reaction vessel; and heating the flash calcined gibbsite and gibbsite in the reaction vessel to a temperature of about 200° C. to about 280° C. and for a time sufficient to form crystalline boehmite; and (ii) calcining the crystalline boehmite to form the transitional alumina.

In any embodiment disclosed herein, the process forms a crystalline boehmite via the stoichiometric process as described herein in any embodiment.

In any embodiment disclosed herein, the calcining may be conducted at a temperature of about 400° F. (~204° C.) to about 1200° F. (~649° C.). For example, in any embodiment disclosed herein, the calcination temperature may be about 400° F. (~204° C.) to about 1200° F. (~649° C.), about 450° F. (~232° C.) to about 750° F. (~399° C.), about 700° F. (~371° C.) to about 1100° F. (~593° C.), or any range including and/or in between any two of these values.

In any embodiment disclosed herein, the transitional alumina formed according to the process described herein in any embodiment may include γ-alumina. Additionally or alternatively, in some embodiments of the present technology, the transitional alumina may include other phases that may include, but are not limited to, $\alpha$-$Al_2O_3$, $\eta$-$Al_2O_3$, $\delta$-$Al_2O_3$, $\theta$-$Al_2O_3$, $\kappa$-$Al_2O_3$, $\chi$-$Al_2O_3$, or mixtures thereof.

The size of the transitional alumina crystallites may be estimated based upon the size of the flash calcined gibbsite starting materials based upon x-ray powder diffraction data.

For example, the relative intensity of the 222 reflection to the intensity of the 311 and 400 reflections in the transitional alumina may be determined. For example, where the maximum intensity of the 222 is greater than about 50% that of the 311 flection, the material may be a large crystal transitional alumina.

The process for preparing a transitional alumina as described herein in any embodiment may further include doping the transitional alumina with one or more of a rare earth element, bismuth, an alkaline earth metal, or a mixture of any two or more thereof. In any embodiment disclosed herein, the transitional alumina may be doped with a rare earth element or oxide thereof as described herein. In any embodiment disclosed herein, the transitional alumina may be doped with bismuth. In any embodiment disclosed herein, the transitional alumina may be doped with an alkaline earth metal or oxide thereof as described herein.

In a further aspect, the present technology provides a transitional alumina prepared according to the process as described herein in any embodiment.

In yet another aspect, the present technology provides a composition that includes a crystalline boehmite prepared according to the process as described herein in any embodiment or a transitional alumina prepared according to the process as described herein in any embodiment, wherein the composition is selected from fluid catalyst cracking (FCC) catalysts, catalysts for preparing ethylene oxide, and emissions control catalysts. In any embodiment disclosed herein, the composition may be a FCC catalyst. In any embodiment disclosed herein, the composition may be a catalyst for preparing ethylene oxide. In any embodiment disclosed herein, the composition may be an emission control catalyst.

In another aspect, the present technology provides a FCC catalyst that includes Y-zeolite and a crystalline boehmite having a crystallite size of about 600 Å to about 850 Å. Such crystallite sizes are determined along the crystallographic 120 direction in space group Cmcm (for boehmite). Illustrative sizes that are obtained by the process described above may be from about 600 Å to about 800 Å, about 650 Å to about 800 Å, about 660 Å to about 800 Å, or about 660 Å to about 750 Å.

In any embodiment disclosed herein, the crystalline boehmite may be prepared according to a process that includes: combining stoichiometric amounts of flash calcined gibbsite ($Al_2O_3$) and gibbsite ($Al(OH)_3$) in a pressurizable reaction vessel; and heating the flash calcined gibbsite and gibbsite in the reaction vessel to a temperature of about 200° C. to about 280° C.; wherein the heating occurs for a time sufficient to form crystalline boehmite.

In any embodiment disclosed herein, the catalyst may include a microspherical support that includes the crystalline boehmite as described herein. In any embodiment disclosed herein, the catalyst may further include a transitional alumina; for example, in any embodiment disclosed herein, the catalyst may include a transitional alumina prepared according to the process described herein in any embodiment. In any embodiment disclosed herein, the catalyst may include a transitional alumina where the transitional alumina may be γ-alumina. Additionally or alternatively, in some embodiments of the present technology, the transitional alumina may include other phases that may include, but are not limited to, $\alpha$-$Al_2O_3$, $\eta$-$Al_2O_3$, $\delta$-$Al_2O_3$, $\theta$-$Al_2O_3$, $\kappa$-$Al_2O_3$, $\chi$-$Al_2O_3$, or mixtures thereof.

In any embodiment disclosed herein, the catalyst may include about 5 wt. % to about 60 wt. % of the Y-zeolite based on total weight of the FCC catalyst. Suitable amounts of Y-zeolite may include, but are not limited to, about 5 wt. %, about 10 wt. %, about 15 wt. %, about 20 wt. %, about 25 wt. %, about 30 wt. %, about 35 wt. %, about 40 wt. %, about 45 wt. %, about 50 wt. %, about 55 wt. %, about 60 wt. %, or any range including and/or in between any two of these values. In any embodiment disclosed herein, the FCC catalyst may include an in situ Y-zeolite.

In any embodiment disclosed herein, the FCC catalyst may include an in situ Y-zeolite that may be obtained by: mixing a precursor microspherical support that includes the crystalline boehmite as described herein in any embodiment with sodium silicate, a zeolite initiator, and water to form an alkaline slurry; and heating the alkaline slurry at a temperature, and for a time, sufficient to form the Y-zeolite.

In any embodiment disclosed herein, the precursor microspherical support may be obtained by: spray drying a slurry that may include the crystalline boehmite to obtain the precursor microspheres; and calcining the precursor microspheres at a temperature of about 900° F. (~482° C.) to about 1800° F. (~982° C.).

In any embodiment disclosed herein, the catalyst may further include one or more of a rare earth element, bismuth, an alkaline earth metal, or mixtures thereof. In any embodiment disclosed herein, the catalyst may include a rare earth element or oxide thereof as described herein. In any embodiment disclosed herein, the catalyst may include bismuth. In any embodiment disclosed herein, the catalyst may include an alkaline earth metal or oxide thereof as described herein.

In another aspect, the present technology provides a composition that includes a first FCC catalyst, wherein the first FCC catalyst includes a FCC catalyst as described herein in any embodiment; and one or more of additional FCC catalysts, wherein the one or more additional FCC catalysts are different than the first FCC catalyst.

In any embodiment disclosed herein, the composition may include about 1 wt. % to about 99 wt. % of the first FCC catalyst based on total weight of the catalyst composition. Suitable amounts of the first FCC catalyst may include about 1 wt. %, about 2 wt. %, about 3 wt %, about 4 wt. %, about 5 wt. %, about 6 wt. %, about 7 wt. %, about 8 wt. %, about 9 wt. %, about 10 wt. %, about 15 wt. %, about 20 wt. %, about 25 wt. %, about 30 wt. %, about 35 wt. %, about 40 wt. %, about 45 wt. %, about 50 wt. %, about 55 wt. %, about 60 wt. %, about 65 wt. %, about 70 wt. %, about 75 wt. %, about 80 wt. %, about 85 wt. %, about 90 wt. %, about 95 wt., about 99 wt. %, or any range including and/or in between any two of the preceding values. For example, the first catalyst may be present in an amount from about 1 wt. % to about 99 wt. %, about 5 wt. % to about 85 wt. %, about 10 wt. % to about 70 wt. %, about 15 wt. % to about 60 wt. %, about 20 wt. % to about 50 wt. % based on total weight of the composition or any range including and/or in between any these values.

In any embodiment disclosed herein, the composition may include about 1 wt. % to about 99 wt. % by weight of the one or more additional FCC catalysts based on total weight of the composition. Suitable amounts of the one or more additional FCC catalysts may include about 1 wt. %, about 2 wt. %, about 3 wt. %, about 4 wt. %, about 5 wt. %, about 6 wt. %, about 7 wt. %, about 8 wt. %, about 9 wt. %, about 10 wt. %, about 15 wt. %, about 20 wt. %, about 25 wt. %, about 30 wt. %, about 35 wt. %, about 40 wt. %, about 45 wt. %, about 50 wt. %, about 55 wt. %, about 60 wt. %, about 65 wt. %, about 70 wt. %, about 75 wt. %, about 80 wt. %, about 85 wt. %, about 90 wt. %, about 95 wt., about 99 wt. %, or any range including and/or in between any two of the preceding values. For example, the one or more additional FCC catalysts may be present in an amount from about 1 wt. % to about 99 wt. %, about 5 wt. % to about 85 wt. %, about 10 wt. % to about 70 wt. %, about 15 wt. % to about 60 wt. %, about 20 wt. % to about 50 wt. % based on total weight of the composition or any range including and/or in between any these values.

In another related aspect, the present technology provides a method of cracking a hydrocarbon feed comprising contacting said feed with a FCC catalyst that includes a FCC catalyst as described herein in any embodiment.

The present invention, thus generally described, will be understood more readily by reference to the following examples, which are provided by way of illustration and are not intended to be limiting of the present invention.

EXAMPLES

Example 1. Preparation of crystalline boehmite. A stoichiometric ratio of small-particle gibbsite was situated on one side of a Parr bomb reaction vessel and flash calcined gibbsite on the other to prepare crystalline boehmite in Samples A-C. This arrangement allowed separation of products after the experiment, permitting analysis of the two products. Experiments were conducted at 240° C. for greater than two hours. The resultant boehmite products and crystallite size were confirmed via X-ray diffraction (XRD) analysis.

TABLE 1

| Reaction Conditions for Conproportionation Reaction of Flash Calcined Gibbsite and Gibbsite | | | |
| --- | --- | --- | --- |
| Sample | Reactants | Boehmite Crystallite Size 120 (Å) | Temp. (° C.) | Time (h) |
| A | Gibbsite | 428 | 240° C. | 6 |
| | Flash Calcined Gibbsite | 663 | | |
| B | Gibbsite | 550 | 240° C. | 24 |
| | Flash Calcined Gibbsite | 717 | | |
| C | Gibbsite | 541 | 240° C. | 48 |
| | Flash Calcined Gibbsite | 759 | | |

Figure 2:
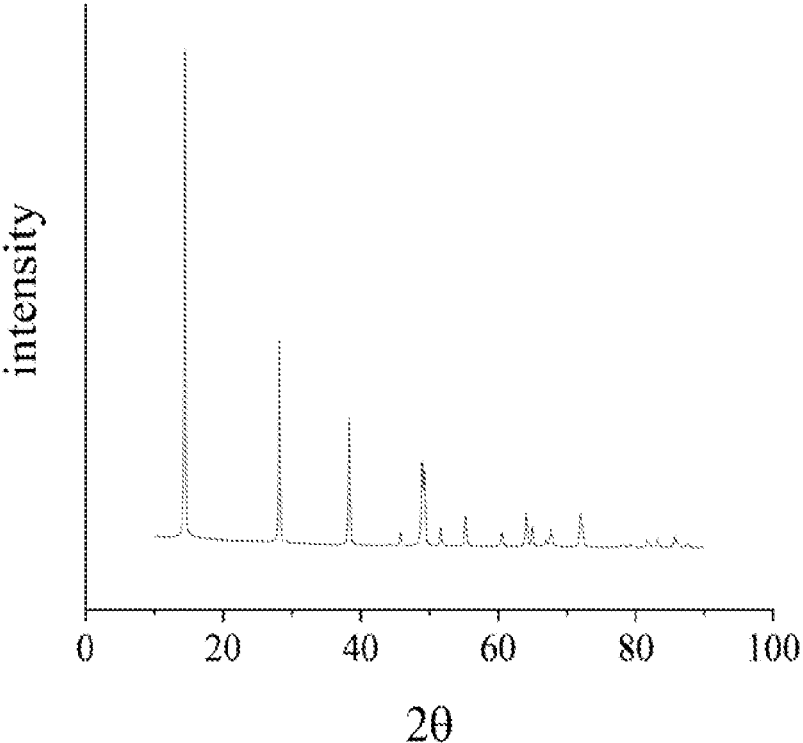
FIG. 2 is an XRD pattern of boehmite (AlOOH) formed from flash calcined gibbsite according to Example 1, Sample A.
Figure 3:
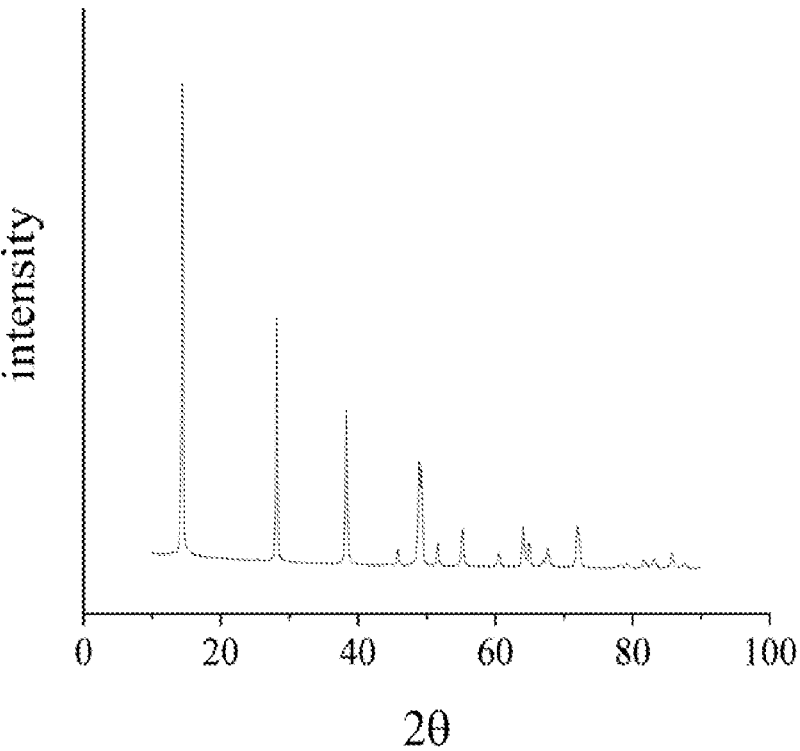
FIG. 3 is an XRD pattern of boehmite (AlOOH) formed from gibbsite according to Example 1, Sample B.
Figure 4:
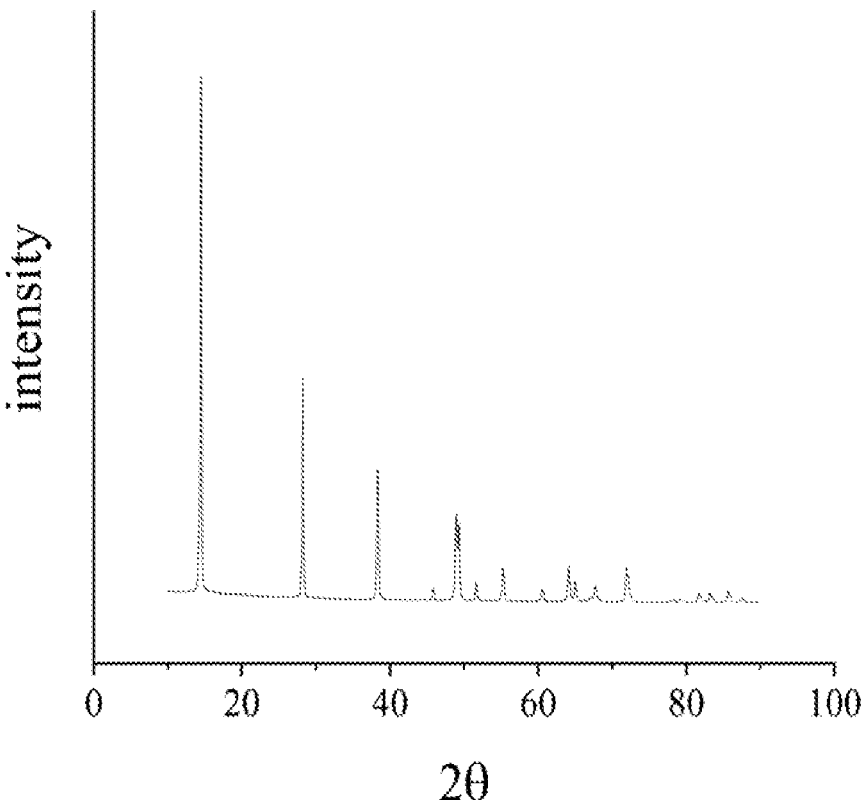
FIG. 4 is an XRD pattern of boehmite (AlOOH) formed from flash calcined gibbsite according to Example 1, Sample B.
Figure 5:
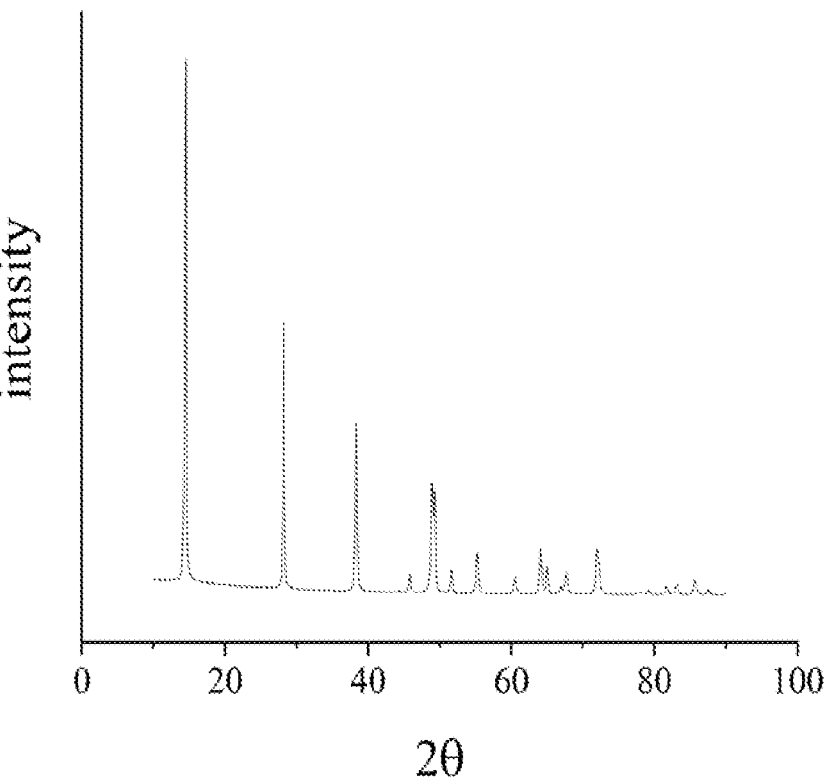
FIG. 5 is an XRD pattern of boehmite (AlOOH) formed from gibbsite according to Example 1, Sample C.
Figure 6:
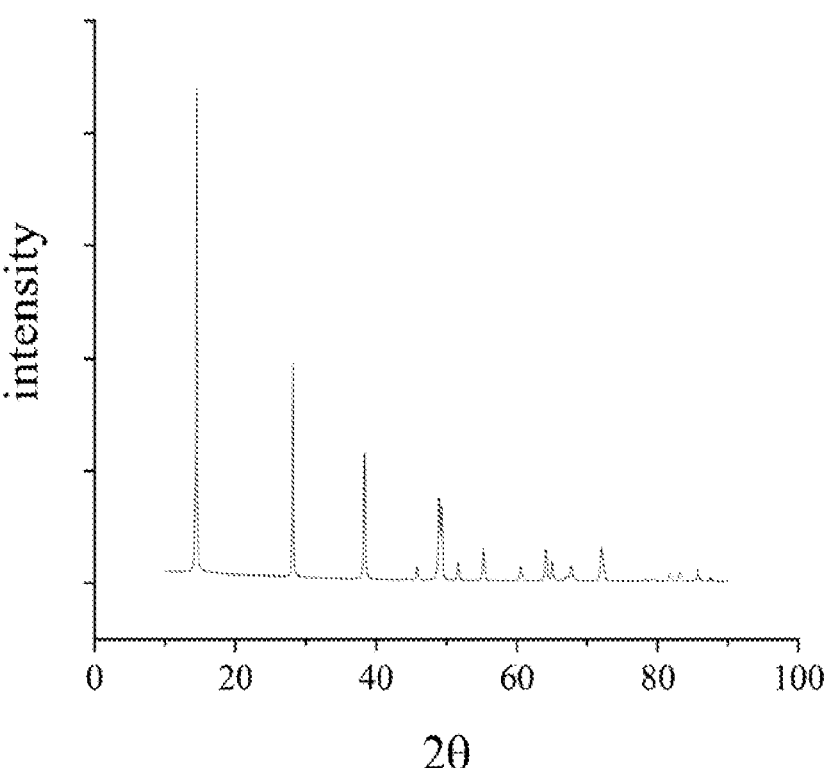
FIG. 6 is an XRD pattern of boehmite (AlOOH) formed from flash calcined gibbsite according to Example 1, Sample C.

As shown in Table 1 above, the experiment was run out to 48 h. At 48 h, the boehmites became more crystalline. The boehmite formed from gibbsite sintered to 54 nm at 48 h (compared to 43 nm at 6 h) and the boehmite formed from flash calcined gibbsite sintered to 76 nm (compared to 66 nm at 6 h). Without being bound by theory, it is believed this boehmite sintering can be beneficially hastened. Steam is known to promote (or catalyze) sintering of boehmite. In a reaction system based on gibbsite and flash calcined gibbsite, steam pressure can be determined by the ratio of gibbsite/flash calcined gibbsite. At the stoichiometric ratio, water from gibbsite is completely consumed by flash calcined gibbsite, both yielding boehmite at 240° C. A slight excess of gibbsite will generate a steam-containing atmosphere above the product boehmites and, as time proceeds, the boehmite will sinter further. FIGS. 1-6 show XRD patterns for the reaction product of gibbsite and flash calcined gibbsite, confirming the formation of boehmite.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, or compositions, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A process for preparing crystalline boehmite, the process comprising:
   combining a stoichiometric amount of flash calcined gibbsite ($Al_2O_3$) and gibbsite ($Al(OH)_3$) in a pressurizable reaction vessel;
   heating the flash calcined gibbsite and gibbsite in the reaction vessel to a temperature of about 200° C. to about 280° C. and for a time sufficient to form crystalline boehmite wherein the combining of the stoichiometric amount of flash calcined gibbsite and gibbsite is at a 1:1 molar ratio of flash calcined gibbsite $Al_2O_3$ to gibbsite $Al(OH)_3$.

2. The process of claim 1, wherein the temperature is from about 200° C. to about 260° C.

3. The process of claim 1, wherein the heating occurs for a time sufficient to form at least about 5 mol % of crystalline boehmite based on the total amount of solids.

4. The process of claim 1, wherein the time sufficient to form crystalline boehmite is at least about 30 minutes.

5. The process of claim 1, wherein the time sufficient to form crystalline boehmite is about 30 minutes to about 1 week.

6. The process of claim 1, wherein the pressurized vessel is configured to prevent or minimize the release of steam from the vessel.

7. The process of claim 1, wherein the crystalline boehmite exhibits a crystallite size of about 600 Å to about 850 Å.

8. The process of claim 1, wherein about 10 mol % to about 100 mol % of crystalline boehmite is formed based on the total amount of solids.

9. The process of claim 1, further comprising doping the crystalline boehmite with a rare earth element, bismuth, an alkaline earth metal, or a mixture of any two or more thereof.

10. The process of claim 1, wherein the flash calcined gibbsite contains up to about 15 wt % water.

11. A process for preparing a transitional alumina, the process comprising:
   preparing crystalline boehmite via a process comprising:
      combining a stoichiometric amount of flash calcined gibbsite ($Al_2O_3$) and gibbsite ($Al(OH)_3$) in a pressurizable reaction vessel;
      heating the flash calcined gibbsite and gibbsite in the reaction vessel to a temperature of about 200° C. to about 280° C. and for a time sufficient to form crystalline boehmite; and
   calcining the crystalline boehmite to form the transitional alumina wherein the combining of the stoichiometric amount of flash calcined gibbsite and gibbsite is at a 1:1 molar ratio of flash calcined gibbsite $Al_2O_3$ to gibbsite $Al(OH)_3$.

12. The process of claim 11, wherein the calcining is conducted at a temperature of about 400° F. to about 1200° F.

13. The process of claim 11, wherein the transitional alumina comprises γ-alumina.

* * * * *